US010678917B1

(12) United States Patent
Witten et al.

(10) Patent No.: US 10,678,917 B1
(45) Date of Patent: Jun. 9, 2020

(54) SYSTEMS AND METHODS FOR EVALUATING UNFAMILIAR EXECUTABLES

(71) Applicant: Symantec Corporation, Mountian View, CA (US)

(72) Inventors: Brian T. Witten, Hermosa Beach, CA (US); Christopher Gates, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 198 days.

(21) Appl. No.: 15/826,642

(22) Filed: Nov. 29, 2017

(51) Int. Cl.
*G06F 21/56* (2013.01)
*G06F 21/55* (2013.01)

(52) U.S. Cl.
CPC .......... *G06F 21/565* (2013.01); *G06F 21/554* (2013.01); *G06F 2221/033* (2013.01)

(58) Field of Classification Search
CPC . G06F 8/31; G06F 8/41; G06F 9/4552; G06F 8/441; G06F 2207/5356; G06F 7/49947; G06F 7/535; G06F 11/3636; G06F 11/3664; G06F 8/433; G06F 8/4435; G06F 11/3466; G06F 11/36; G06F 21/52; G06F 21/77; G06F 21/83; G06F 2201/865; G06F 8/51; G06F 8/53; G06F 8/61; G06F 9/542; G06F 11/3604; G06F 11/3608; G06F 11/3624; G06F 11/3668; G06F 16/90332; G06F 21/44; G06F 21/562; G06F 21/577; G06F 21/606; G06F 2221/033; G06F 8/33; G06F 8/44; G06F 8/443; G06F 8/4442; G06F 9/44526; G06F 9/4486; G06F 9/449; G06Q 20/341; G06Q 20/382;
(Continued)

(56) References Cited

U.S. PATENT DOCUMENTS 8,621,233 B1 * 12/2013 Manadhata ............. G06F 21/56 709/224
9,231,969 B1 * 1/2016 Satish ................. H04L 63/1433
(Continued)

OTHER PUBLICATIONS

Hu et al.; .NET malware dynamic instrumentation (https://www.virusbulletin.com/uploads/pdf/conference_slides/2014/Hu-VB2014.pdf); Feb. 15, 2015.
(Continued)

*Primary Examiner* — Abiy Getachew
(74) *Attorney, Agent, or Firm* — FisherBroyles, LLP

(57) ABSTRACT

The disclosed computer-implemented method for evaluating unfamiliar executables may include (i) identifying, on the computing device, (a) a code object that is generated from source code written in a programming language, that is specified in an intermediate language different from the programming language, and that can be compiled into an executable file by a just-in-time compiler on the computing device and (b) an executable file that lacks an assigned reputation in a reputation system that distinguishes benign and malicious files, (ii) determining that the executable file was produced by the just-in-time compiler compiling the code object on the computing device, (iii) retrieving, from the reputation system, a reputation for the code object, and (iv) performing a security action on the executable file that is based on the reputation of the code object. Various other methods, systems, and computer-readable media are also disclosed.

20 Claims, 7 Drawing Sheets

(58) Field of Classification Search
CPC .......... G06Q 20/4012; G06Q 20/4016; G06Q 20/405; G06Q 20/409; G06Q 20/4093; H04L 63/1425; H04L 63/143
See application file for complete search history.

(56) References Cited

U.S. PATENT DOCUMENTS

| | | | |
|---|---|---|---|
| 2005/0102658 A1* | 5/2005 | Li | G06F 8/441 717/140 |
| 2008/0168438 A1* | 7/2008 | Meijer | G06F 9/4484 718/1 |
| 2010/0198836 A1* | 8/2010 | Glass | G06O 30/02 707/748 |
| 2015/0052258 A1* | 2/2015 | Johnson | H04L 67/141 709/228 |
| 2016/0323108 A1* | 11/2016 | Bhogal | H04L 63/123 |

OTHER PUBLICATIONS

CLR dynamic hook injection (http://www.dupuis.me/node/18); as accessed on Nov. 13, 2017.
Wang; NET CLR Injection: Modify IL Code during Run-time (https://www.codeproject.com/Articles/463508/NET-CLR-Injection-Modify-IL-Code-during-Run-time); Aug. 7, 2014.

\* cited by examiner

SYSTEMS AND METHODS FOR EVALUATING UNFAMILIAR EXECUTABLES

BACKGROUND

Many malicious files are seen only once and only on one machine. Such files are known as singletons. While many singletons are malicious, singletons cannot reliably be automatically classified as malicious because several benign factors produce singletons, including bytecode that is produced by development environments for high-level programming languages and then just-in-time compiled to native code, which creates executable files that are frequently unique to an individual machine. Other benign sources of singletons include innocuous files which embed directly in the file license strings and other material unique to each instance of a file.

Many traditional systems for determining whether a file is malicious rely on reputation databases that store fingerprints of files known to be malicious or benign. However, such systems are ineffective at classifying singletons based on reputation because singletons have not been observed on other machines and given a reputation. While some methods of exonerating benign singletons exist, traditional methods are often not thorough enough to safely exonerate a sufficient proportion of files such that any file not exonerated can be safely convicted. Unfortunately, just-in-time compilation appears to be one of the leading causes of benign singletons, and exonerating all such singletons would allow attackers to better use bytecode for distribution of malware. The instant disclosure, therefore, identifies and addresses a need for systems and methods for evaluating unfamiliar executables.

SUMMARY

As will be described in greater detail below, the instant disclosure describes various systems and methods for evaluating unfamiliar executables.

In one example, a computer-implemented method for evaluating unfamiliar executables may include (i) identifying, on the computing device, (a) a code object that is generated from source code written in a programming language, that is specified in an intermediate language different from the programming language, and that can be compiled into an executable file by a just-in-time compiler on the computing device and (b) an executable file that lacks an assigned reputation in a reputation system that distinguishes benign and malicious files, (ii) determining that the executable file was produced by the just-in-time compiler compiling the code object on the computing device, (iii) retrieving, from the reputation system, a reputation for the code object, and (iv) performing a security action on the executable file that is based on the reputation of the code object rather than the assigned reputation of the executable file due to the executable file lacking the assigned reputation in the reputation system.

In some examples, performing the security action may include allowing the executable file to execute based on determining, based on the reputation of the code object, the code object is benign. In other examples, performing the security action may include preventing the executable file from executing based on determining, based on the reputation of the code object, that the code object is malicious.

In one embodiment, the computer-implemented method may further include identifying an additional executable file that has an additional assigned reputation in the reputation system and performing a security action on the additional executable file based on the additional assigned reputation of the additional executable file in the reputation system. In one embodiment, identifying the executable file may include determining that the executable file is a singleton that has not been previously identified on any computing system connected to the reputation system and performing the security action on the executable file that is based on the reputation of the code object rather than the assigned reputation of the executable file due to the executable file may be in response to determining that the executable file is a singleton. In one embodiment, the intermediate language may include bytecode.

In one embodiment, identifying the executable file may include quarantining the executable file and performing the security action on the executable file may include removing the executable file from quarantine. In one embodiment, the computer-implemented method may further include (i) identifying an additional executable file that was produced by an additional code object, (ii) monitoring behavior of the additional executable file, and (iii) assigning a reputation to the additional code object in the reputation system based on the behavior of the additional executable file.

In some embodiments, determining that the executable file was produced by the just-in-time compiler compiling the code object on the computing device may include configuring the just-in-time compiler to store output to a specified file system layer and monitoring the specified file system layer to which the just-in-time compiler stores the output. In some embodiments, determining that the executable file was produced by the just-in-time compiler compiling the code object on the computing device may include hooking the just-in-time compiler. Additionally or alternatively, determining that the executable file was produced by the just-in-time compiler compiling the code object on the computing device may include determining that just-in-time compiler produced the executable file within a predetermined time of the just-in-time compiler reading the code object.

In one embodiment, a system for implementing the above-described method may include (i) an identification module, stored in memory, that identifies, on the computing device, (a) a code object that is generated from source code written in a programming language, that is specified in an intermediate language different from the programming language, and that can be compiled into an executable file by a just-in-time compiler on the computing device and (b) an executable file that lacks an assigned reputation in a reputation system that distinguishes benign and malicious files, (ii) a determination module, stored in memory, that determines that the executable file was produced by the just-in-time compiler compiling the code object on the computing device, (iii) a retrieving module, stored in memory, that retrieves, from the reputation system, a reputation for the code object, (iv) a security module, stored in memory, that performs a security action on the executable file that is based on the reputation of the code object rather than the assigned reputation of the executable file due to the executable file lacking the assigned reputation in the reputation system, and (v) at least one physical processor configured to execute the identification module, the determination module, the retrieving module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, on the computing device, (a) a code object that is generated from source code written in a programming language, that is specified in an intermediate language different from the programming language, and that can be compiled into an executable file by a just-in-time compiler on the computing device and (b) an executable file that lacks an assigned reputation in a reputation system that distinguishes benign and malicious files, (ii) determine that the executable file was produced by the just-in-time compiler compiling the code object on the computing device, (iii) retrieve, from the reputation system, a reputation for the code object, and (iv) perform a security action on the executable file that is based on the reputation of the code object rather than the assigned reputation of the executable file due to the executable file lacking the assigned reputation in the reputation system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
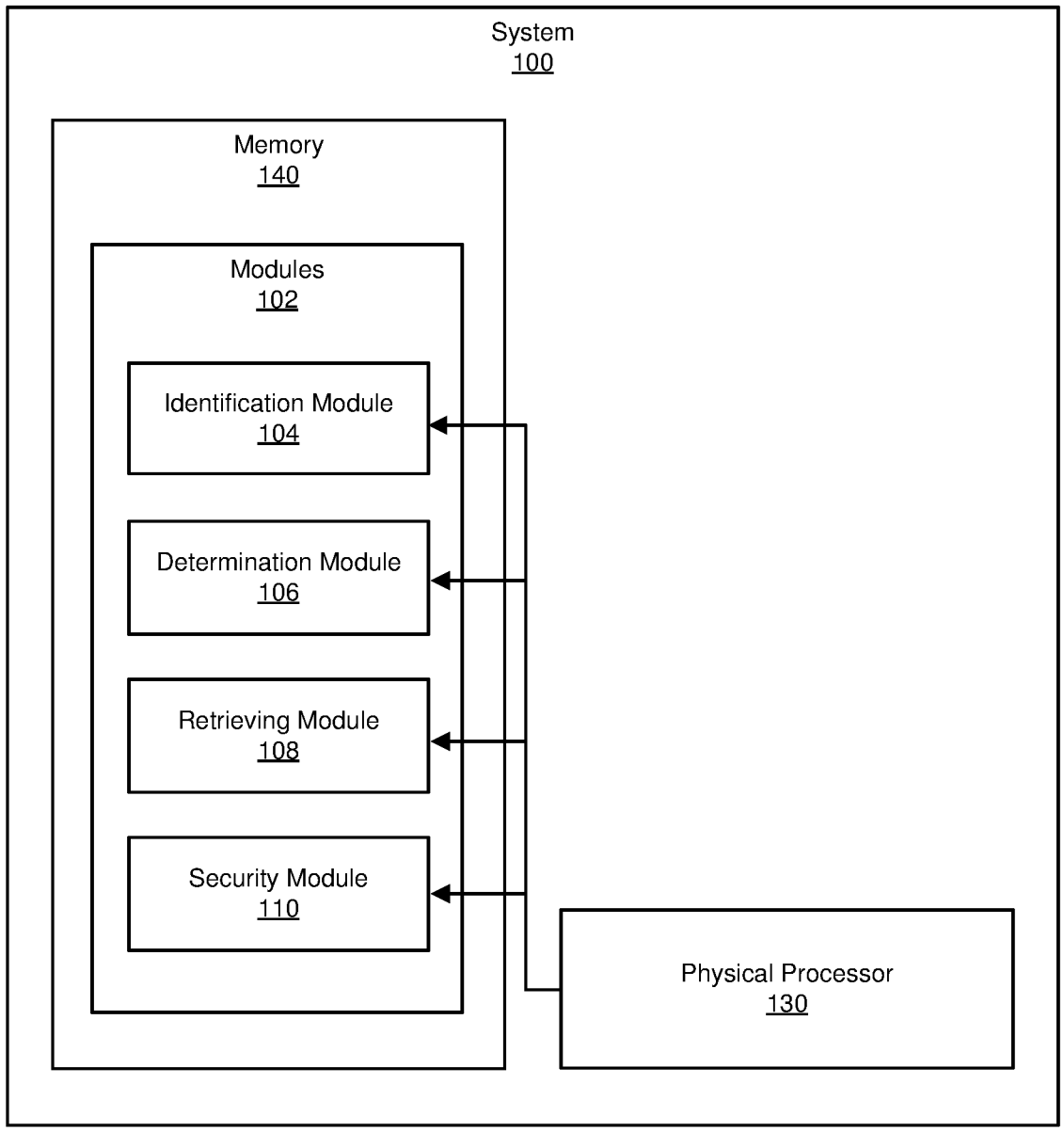
FIG. 1 is a block diagram of an example system for evaluating unfamiliar executables.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for evaluating unfamiliar executables. As will be explained in greater detail below, by correlating an unfamiliar executable file with the code object that produced the executable file and applying the reputation of the code object to the executable file, the systems and methods described herein may accurately apply reputations to executable files that are not themselves found in reputation systems but are produced by known code objects. By determining reputations of executable files in this way, the systems and methods described herein may improve the ability of security systems to identify benign and malicious singletons, thereby reducing the number of false positives and/or false negatives when attempting to classify unfamiliar executable files. In addition, the systems and methods described herein may improve the functioning of a computing device by detecting potentially malicious files with increased accuracy and thus reducing the computing device's likelihood of infection. These systems and methods may also improve the field of reputation-based computer security by expanding the applications of a reputation system that tracks reputations for files of different types.

Figure 2:
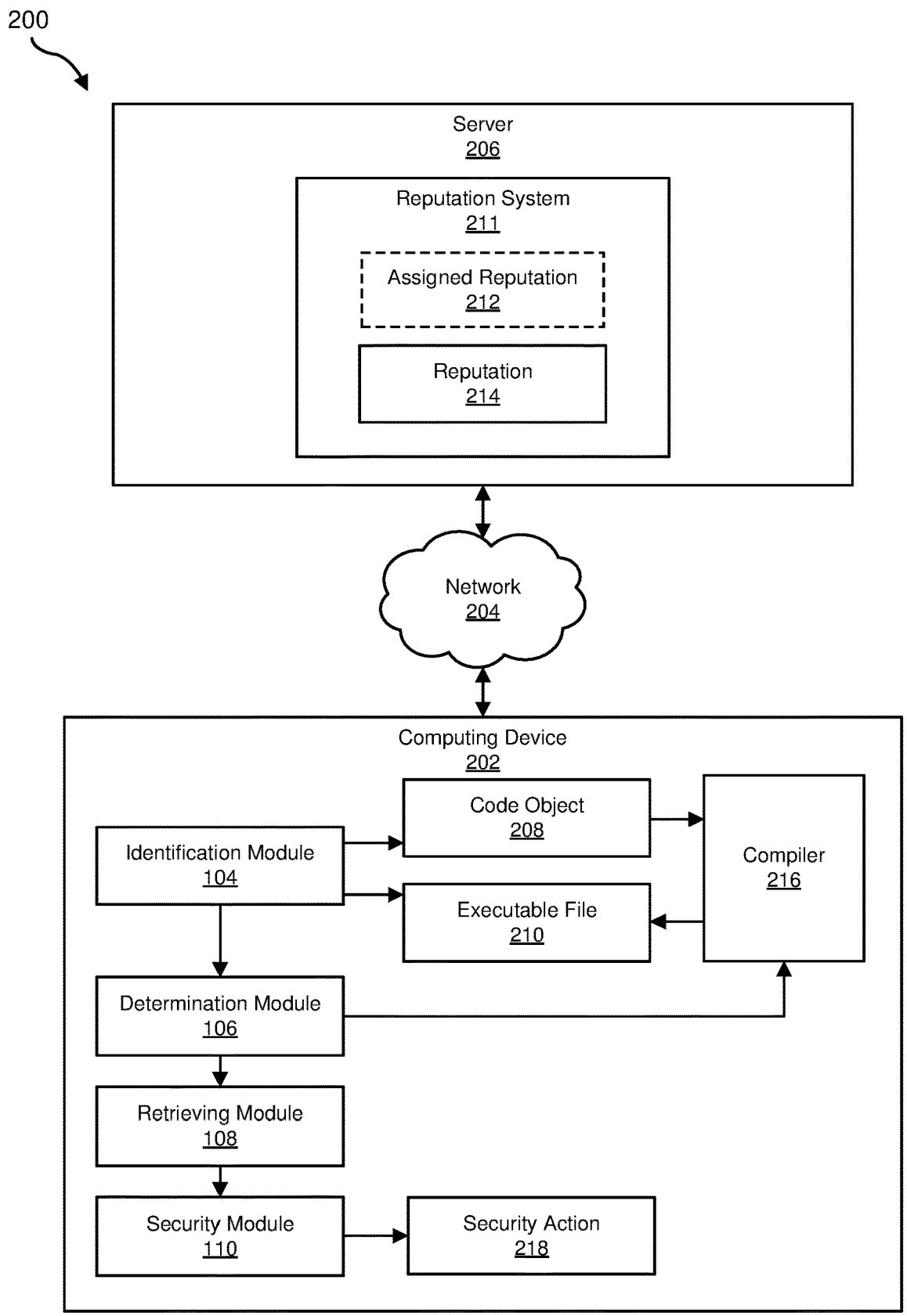
FIG. 2 is a block diagram of an additional example system for evaluating unfamiliar executables.
Figure 3:
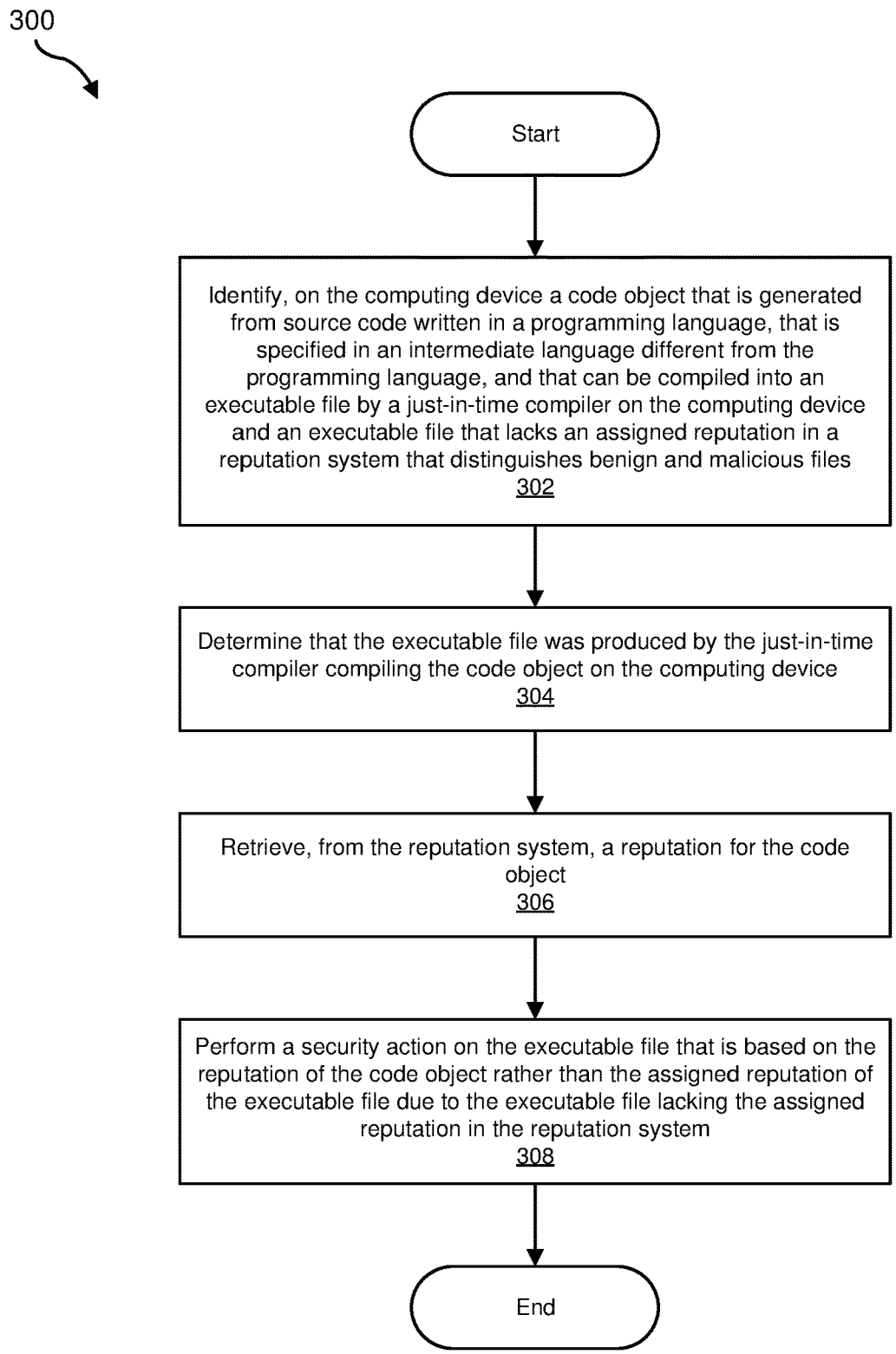
FIG. 3 is a flow diagram of an example method for evaluating unfamiliar executables.
Figure 4:
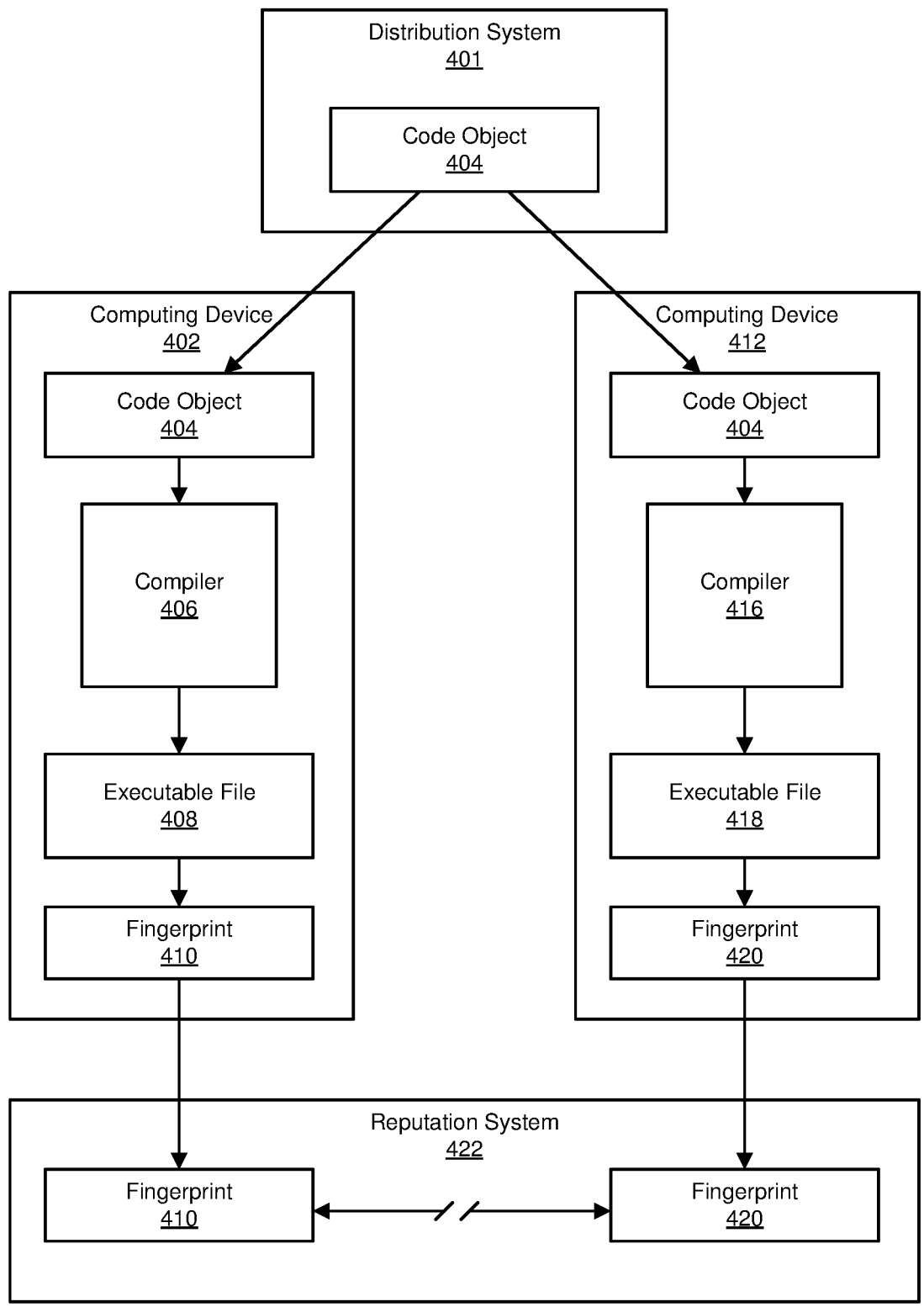
FIG. 4 is a block diagram of an example computing system for evaluating unfamiliar executables.

The following will provide, with reference to FIGS. 1, 2, and 4, detailed descriptions of example systems for evaluating unfamiliar executables. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of example system 100 for evaluating unfamiliar executables. As illustrated in this figure, example system 100 may include one or more modules 102 for performing one or more tasks. For example, and as will be explained in greater detail below, example system 100 may include an identification module 104 that identifies, on the computing device, (a) a code object that is generated from source code written in a programming language, that is specified in an intermediate language different from the programming language, and that can be compiled into an executable file by a just-in-time compiler on the computing device and (b) an executable file that lacks an assigned reputation in a reputation system that distinguishes benign and malicious files. Example system 100 may additionally include a determination module 106 that determines that the executable file was produced by the just-in-time compiler compiling the code object on the computing device. Example system 100 may also include a retrieving module 108 that retrieves, from the reputation system, a reputation for the code object. Example system 100 may additionally include a security module 110 that performs a security action on the executable file that is based on the reputation of the code object rather than the assigned reputation of the executable file due to the executable file lacking the assigned reputation in the reputation system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate evaluating unfamiliar executables. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to evaluate unfamiliar executables. For example, and as will be described in greater detail below, identification module 104 may identify, on computing device 202, (a) a code object 208 that is generated from source code written in a programming language, that is specified in an intermediate language different from the programming language, and that can be compiled into an executable file 210 by a just-in-time compiler 216 on computing device 202 and (b) an executable file 210 that lacks an assigned reputation 212 in a reputation system 211 that distinguishes benign and malicious files. Next, determination module 106 may determine that executable file 210 was produced by the just-in-time compiler 216 compiling code object 208 on computing device 202. Based on this determination, retrieving module 108 may retrieve, from reputation system 211, a reputation 214 for code object 208. Finally, security module 110 may perform a security action 218 on executable file 210 that is based on reputation 214 of code object 208 rather than assigned reputation 212 of executable file 210 due to executable file 210 lacking assigned reputation 212 in reputation system 211.

Computing device 202 generally represents any type or form of computing device capable of reading computer-executable instructions. In some embodiments, computing device 202 may be a personal computing device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of hosting reputation ratings. In one embodiment, server 206 may be a reputation server. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Code object 208 generally represents any type or form of file and/or computing object that can be compiled into an executable. Executable file 210 generally represents any type or form of file that is capable of launching a computing process. Reputation system 211 generally represents any type or form of system, application, database, software, and/or combination thereof that tracks reputations of files and/or representations of files. Assigned reputation 212 and reputation 214 generally represent any type of classification and/or probability of maliciousness or non-maliciousness as stored in a reputation system. Compiler 216 generally represents any type or form of software, application, and/or process capable of transforming a code object into an executable file. Security action 218 generally represents any type of action taken by a security system on and/or relating to a file.

FIG. 3 is a flow diagram of an example computer-implemented method 300 for evaluating unfamiliar executables. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, on the computing device, (a) a code object that is generated from source code written in a programming language, that is specified in an intermediate language different from the programming language, and that can be compiled into an executable file by a just-in-time compiler on the computing device and (b) an executable file that lacks an assigned reputation in a reputation system that distinguishes benign and malicious files. For example, identification module 104 may, as part of computing device 202 in FIG. 2, identify, on computing device 202, (a) code object 208 that is generated from source code written in a programming language, that is specified in an intermediate language different from the programming language, and that can be compiled into executable file 210 by just-in-time compiler 216 on computing device 202 and (b) executable file 210 that lacks assigned reputation 212 in reputation system 211 that distinguishes benign and malicious files.

The term "code object," as used herein, generally refers to any computing object that is generated from source code and that can be compiled into an executable file. In some embodiments, a code object may be specified in an intermediate language. The term "intermediate language," as used herein, generally refers to any computing language that is not a programming language used by developers to code programs but is also not machine code. In some examples, an intermediate language may be human-readable, while in other examples, an intermediate language may not be human-readable. In one example, the intermediate language may be bytecode. In some examples, the intermediate language may be common intermediate language (CIL). In other examples, the intermediate language may be JAVA bytecode. In some embodiments, a code object may be distributed to a computing device to be compiled on the computing device.

The phrase "programming language," as used herein, generally refers to any high-level language used by a developer to create a program. In some embodiments, a programming language may be a language designed to generate a code object that is then compiled into an executable. Examples of programming languages may include, without limitation, VB.NET, C #.NET, and/or JAVA.

The term "executable file," as used herein, generally refers to any file, application, and/or software capable of launching a process. In some embodiments, an executable file may be created by compiling a code object. In one embodiment, an executable file may be a binary file. In some embodiments, an executable file may be specified in and/or interpreted as machine code. In some examples, an executable file may be directly executable by an operating system (e.g., without further interpretation, modification, and/or transformation). In one embodiment, an executable file may have an "exe" file extension.

The term "just-in-time (JIT) compiler," as used herein, generally refers to any software that transforms computing code in a file from one language and/or format into another at the time of the execution of the file. In some embodiments, a JIT compiler may compile bytecode into machine code. In one embodiment, a JIT compiler may compile CIL bytecode into an executable file.

The term "reputation system," as used herein, generally refers to any system that stores information about the confirmed and/or potential maliciousness and/or non-maliciousness of files. In some embodiments, a reputation system may generate reputations by gathering data about the malicious and/or benign behavior exhibited by files on computing systems connected to the reputation system. In one embodiment, a reputation system may store reputation data on a reputation server and respond to queries about files from computing systems. Additionally or alternatively, a reputation system may store reputation data locally on computing systems. In some embodiments, a reputation system may store a reputation for every file encountered on a computing system connected to the reputation system. In other embodiments, a reputation system may only store reputation data about files on which analysis has been performed and/or for which behavior has been observed. In some embodiments, a reputation system may reference files using hashes, fingerprints, and/or signatures. In some examples, a reputation system may assign reputations to files via categories, tags, and/or numerical scores.

Identification module 104 may identify the code object and/or executable file in a variety of ways and/or contexts. In some embodiments, identification module 104 may identify the code object in response to determining that the executable file has no reputation in the reputation system. In other embodiments, identification module 104 may identify the code object when the code object is created on and/or received by the computing device.

In some embodiments, identification module 104 may be part of a security application that identifies all potentially malicious files. Additionally or alternatively, identification module 104 may be part of a security application that is configured to detect potentially malicious executable files. In some examples, identification module 104 may identify the executable file in response to the executable file attempting to launch a process. In some examples, identification module 104 may identify the executable file at the time that the JIT compiler creates the executable file.

At step 304, one or more of the systems described herein may determine that the executable file was produced by the JIT compiler compiling the code object on the computing device. For example, determination module 106 may, as part of computing device 202 in FIG. 2, determine that executable file 210 was produced by the JIT compiler 216 compiling code object 208 on computing device 202.

Determination module 106 may determine that the executable file was produced by the JIT compiler compiling the code object in a variety of ways. In some examples, determination module 106 may determine that the executable file was produced by the JIT compiler compiling the code object on the computing device by configuring the JIT compiler to store output to a specified file system layer and monitoring the specified file system layer to which the JIT compiler stores the output. In some embodiments, the specified file system layer may be a virtual file system layer. In one embodiment, the systems described herein may create a virtual file system and/or may specify a section of a virtual file system for the JIT compiler to store output. In some embodiments, the systems described herein may use the virtual file system layer to identify files produced by the JIT compiler because only files produced by the JIT compiler will be stored in the specified section of the virtual file system. Additionally or alternatively, the systems described herein may use the virtual file system layer to quarantine unfamiliar executable files by limiting the permissions applied to all files stored in the specified portion of the virtual file system. In one embodiment, determination module 106 may hook the JIT compiler by inserting code into the JIT compiler. In some examples, hooking the JIT compiler may enable determination module 106 to gain visibility into which executable file was produced by compiling which code object.

Additionally or alternatively, determination module 106 may determine that the executable file was produced by the JIT compiler compiling the code object on the computing device by determining that JIT compiler produced the executable file within a predetermined time of the JIT compiler reading the code object. For example, if the executable file is created within a specified file layer within a few seconds and/or milliseconds of the JIT compiler reading the code object, determination module 106 may determine that the JIT compiler produced the executable file by compiling the code object. In another example, if no executable files are created for several minutes, the JIT compiler reads a single code object, and then an executable file is created, determination module 106 may determine that the JIT compiler produced the executable file by compiling the code object that was most recently read by the JIT compiler.

At step 306, one or more of the systems described herein may retrieve, from the reputation system, a reputation for the code object. For example, retrieving module 108 may, as part of computing device 202 in FIG. 2, retrieve, from reputation system 211, reputation 214 for code object 208.

Retrieving module 108 may retrieve the reputation from the reputation system in a variety of ways and/or contexts. In some examples, retrieving module 108 may look up the reputation in a local reputation store. In other examples, reputation module 108 may query a reputation server. Retrieving module 108 may identify the code object to the reputation system in a variety of ways, including but not limited to using a hash of the code object, the name of the code object, metadata related to the code object, a signature of the code object, and/or a fingerprint of the code object.

In some embodiments, retrieving module 108 may retrieve a reputation for every code object identified on the computing device. In other embodiments, retrieving module 108 may retrieve the reputation for the code object in response to the systems described herein identifying the executable, determining that the executable has no reputation (e.g., determining that the executable has not been observed by the reputation system on other computing systems), and associating the executable with the code object.

At step 308, one or more of the systems described herein may perform a security action on the executable file that is based on the reputation of the code object rather than the assigned reputation of the executable file due to the executable file lacking the assigned reputation in the reputation system. For example, security module 110 may, as part of computing device 202 in FIG. 2, perform security action 218 on executable file 210 that is based on reputation 214 of code object 208 rather than assigned reputation 212 of executable file 210 due to executable file 210 lacking assigned reputation 212 in reputation system 211.

Security module 110 may perform a variety of security actions on the executable file. For example, security module 110 may allow the executable file to execute based on determining, based on the reputation of the code object, the code object is benign. In some examples, security module 110 may move the executable file out of quarantine before allowing the executable file to execute. In one example, security module 110 may provide the executable file with privileges previously denied to the executable file, such as the ability to modify other files.

In some examples, security module 110 may perform the security action by preventing the executable file from executing based on determining, based on the reputation of the code object, that the code object is malicious. In some embodiments, security module 110 may delete and/or quarantine the executable file in response to determining that the code object is malicious. In one embodiment, if no reputation is available for the code object, security module 110 may assume that the executable file is malicious and/or suspicious and/or may limit privileges available to the executable file and/or prevent the executable file from executing.

In some examples, identification module 104 may identify the executable file by determining that the executable file is a singleton that has not been previously identified on any computing system connected to the reputation system and security module 110 may perform the security action on the executable file that is based on the reputation of the code object rather than the assigned reputation of the executable file due to the executable file in response to determining that the executable file is the singleton. In these examples, the executable file may be a singleton due to the idiosyncratic way in which JIT compilers produce executable files.

In some cases, instances of the same JIT compiler running on computing devices with the same configuration may ingest instances of the same code object and output executable files that are slightly different and yield different fingerprints and/or signatures. In these cases, it may be difficult to directly associate a reputation score for one executable file with any other executable file because each executable file may appear to the reputation system to be a unique file that has never been seen before, despite behaving identically to any other executable file produced by compiling the same code object. For example, as illustrated in FIG. 4, a distribution system 401 may distribute instances of a code object 404 to a computing device 402 and a computing device 412. A compiler 406 on computing device 402 may compile code object 404 into an executable file 408 that has a fingerprint 410 while a compiler 416 on computing device 412 may compile code object 404 into an executable file 418 that has a fingerprint 420. In some examples, computing device 402 may send fingerprint 410 to a reputation system 422 for analysis while computing device 412 may send fingerprint 420 to reputation system 422. In one example, reputation system 422 may determine that fingerprint 410 does not match fingerprint 420 and may thus not associate reputation data for executable 408 with reputation data for executable 418 even though both executables were compiled from code object 404 and can be expected to exhibit the same behavior.

In some embodiments, the systems described herein may associate an executable file with a code object and/or apply the reputation of a code object to an executable file only when the executable file does not have a reputation. For example, the systems described herein may identify an executable file that has an assigned reputation in the reputation system and may perform a security action on the executable file based on the assigned reputation of the executable file in the reputation system without associating the executable file with any code object because the executable file itself has a reputation.

In some embodiments, the systems described herein may identify an executable file that was produced by a code object, monitor the behavior of the executable file, and assign a reputation to the code object in the reputation system based on the behavior of the executable file. For example, if the executable file performs malicious actions, the systems described herein may assign a malicious reputation to the code object. In another example, if the executable file performs only benign actions, the systems described herein may assign a benign reputation to the code object. Because all executable files produced by the same code object will have similar or identical behavior, any executable file produced by the same code object on any computing device will be equally malicious or benign.

Figure 5:
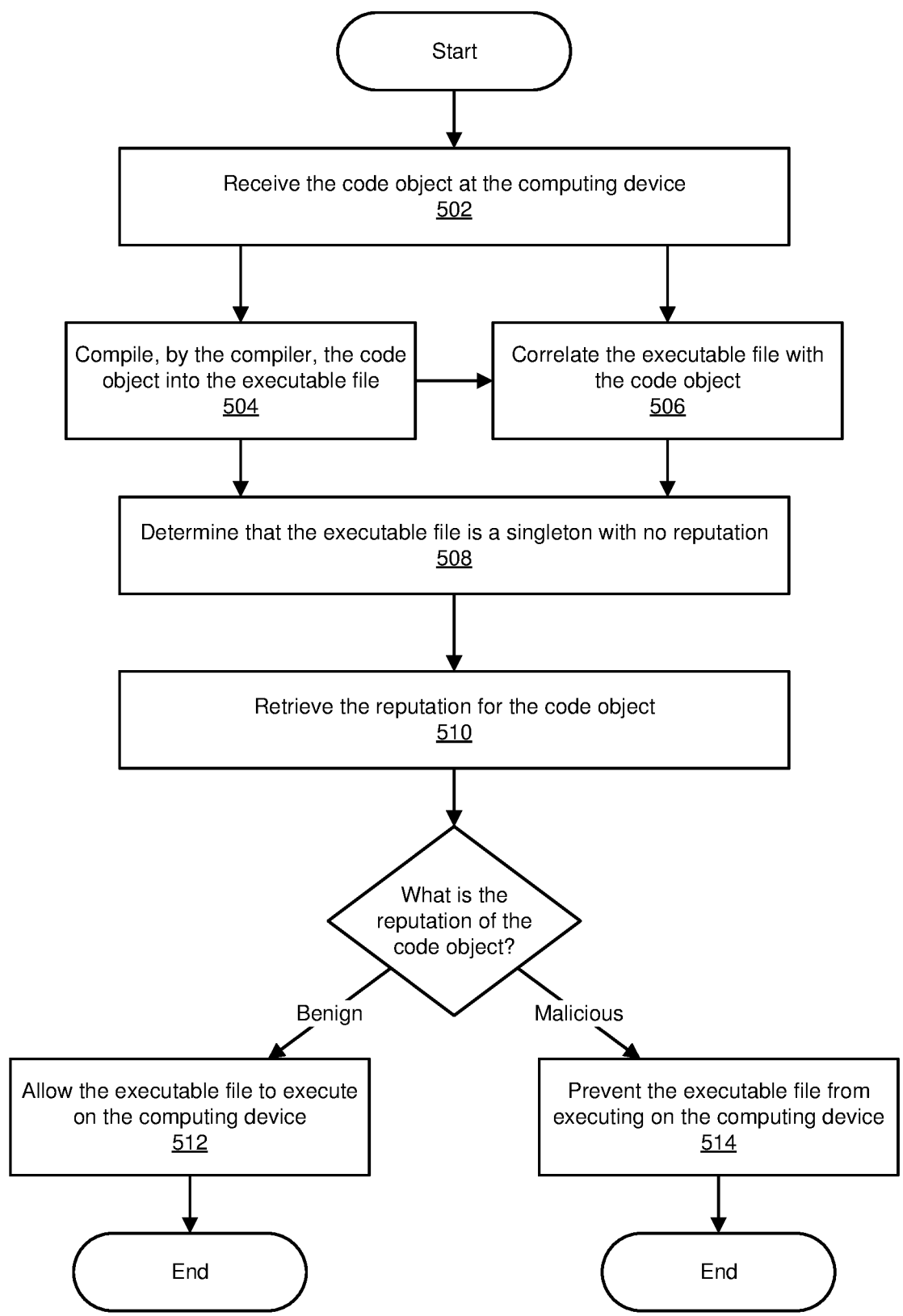
FIG. 5 is a flow diagram of an example method for evaluating unfamiliar executables.

In some embodiments, the systems described herein may correlate code objects with executable files as soon as the executable files are produced in order to more efficiently apply reputation data from code objects to executables. For example, as illustrated in FIG. 5, at step 502, the systems described herein may receive the code object at the computing device. In some examples, the systems described herein may download the code object from a website and/or web server. In other examples, the systems described herein may receive the code object from another device on a local network. At step 504, the systems described herein may compile, by the compiler on the computing device, the code object into the executable file. In some embodiments, at step 506, the systems described herein may correlate the executable file with the code object. For example, the systems described herein may monitor the compiler to detect when the compiler produces an executable file and immediately correlate the executable file with the last code object ingested by the compiler.

At step 508, the systems described herein may determine that the executable file is a singleton with no reputation. In one example, the systems described herein may send a fingerprint of the executable file to a reputation system and may receive a response indicating that the fingerprint is not listed in a reputation database for the reputation system. At step 510, the systems described herein may retrieve the reputation for the code object from a reputation system. In some embodiments, one reputation system may store reputations for both executable files and code objects. In other embodiments, the systems described herein may query different reputation systems about reputations for executable files and code objects. If the reputation for the code object is benign, then at step 512, the systems described herein may allow the executable file to execute. If the reputation for the code object is malicious, at step 514 the systems described herein may prevent the executable file from executing on the computing device. In some embodiments, the systems described herein may monitor the behavior of the executable file and/or update the reputation system with information about malicious or benign actions taken by the executable file so that the updated reputation can be applied to the code object.

As explained in connection with method 300 above, the systems and methods described herein may take appropriate security actions on unfamiliar executable files by correlating an unfamiliar executable file with a familiar code object that was compiled into the executable file and applying the reputation for the code object to the executable file. In one example, an executable file using the .NET framework may be produced by JIT compiling a CIL bytecode file produced from MICROSOFT common language infrastructure. In some examples, the executable file may be unknown to reputation systems due to being very slightly different from any other executable file produced by compiling the same bytecode. In some examples, the systems described herein may correlate the bytecode file with the executable file, determine that a reputation exists for the bytecode file that is based on the actions of other executable files compiled from the bytecode file on other systems, and then apply the reputation for the bytecode file to the executable file on the current system. By tracking reputations for bytecode files and applying those reputations to executable files produced by compiling the bytecode files, the systems described herein may enable security systems to accurately predict the behavior of singleton executable files produced via JIT compilation, improving the security of computing devices.

Figure 6:
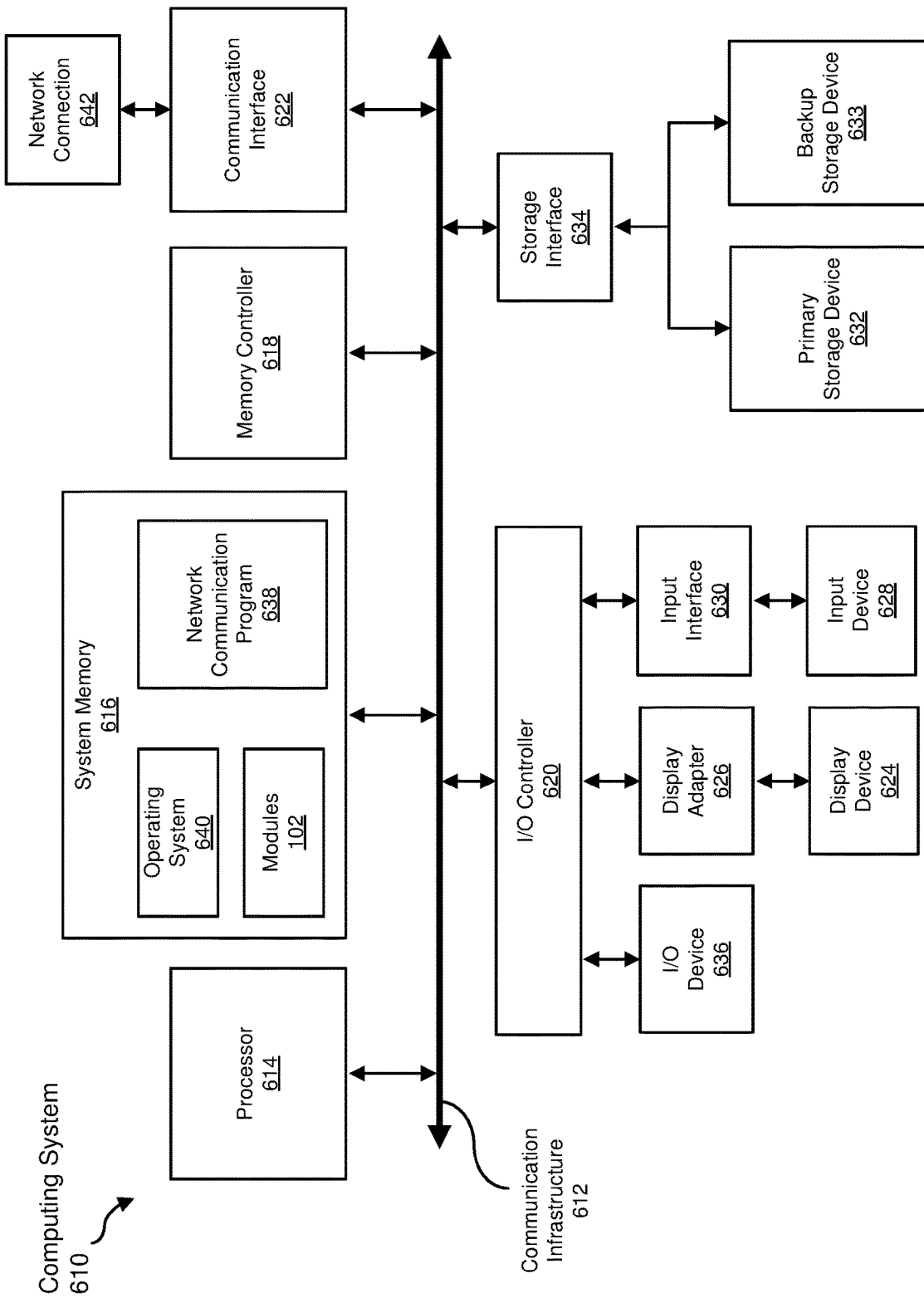
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
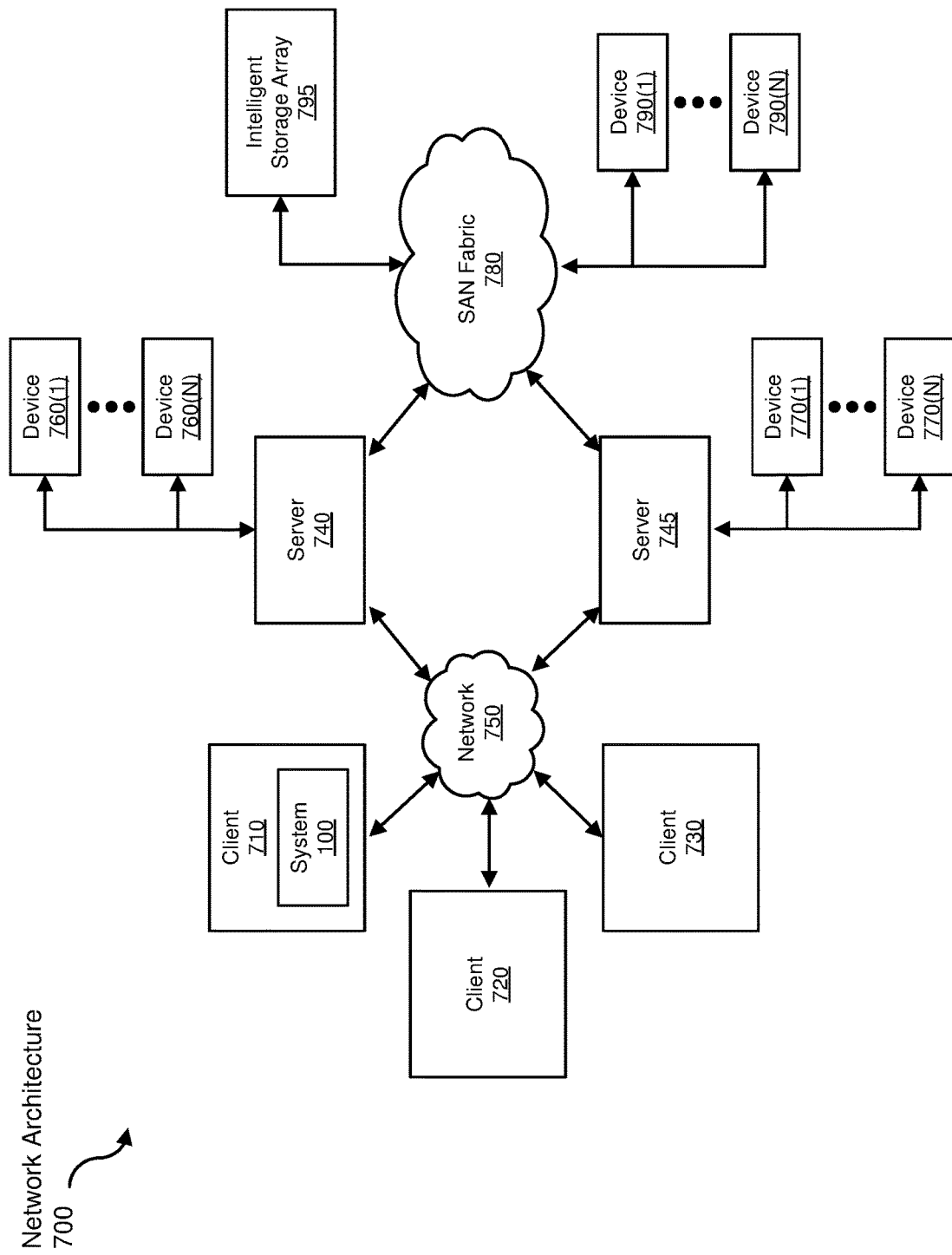
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for evaluating unfamiliar executables.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive code object reputation data to be transformed, transform the code object reputation data into executable file reputation data, output a result of the transformation to a security system, use the result of the transformation to determine which security action to perform, and store the result of the transformation to a security system and/or reputation system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating unfamiliar executables, at least a portion of the method being performed by a computing device comprising at least one processor, the method comprising:
   identifying, on the computing device:
      a code object that is generated from source code written in a programming language, that is specified in an intermediate language different from the programming language, and that can be compiled into an executable file by a just-in-time compiler on the computing device; and
      an executable file that lacks an assigned reputation in a reputation system that distinguishes benign and malicious files;
   associating the executable file with the code object based on determining that the executable file was produced by the just-in-time compiler compiling the code object on the computing device; and
   in response to associating the executable file with the code object:
      retrieving, from the reputation system, a reputation for the code object; and
      performing a security action on the executable file that is based on the reputation of the code object rather than the assigned reputation of the executable file due to the executable file lacking the assigned reputation in the reputation system.

2. The computer-implemented method of claim 1, wherein performing the security action comprises allowing the executable file to execute based on determining, based on the reputation of the code object, the code object is benign.

3. The computer-implemented method of claim 1, wherein performing the security action comprises preventing the executable file from executing based on determining, based on the reputation of the code object, that the code object is malicious.

4. The computer-implemented method of claim 1, further comprising:
   identifying an additional executable file that has an additional assigned reputation in the reputation system; and
   performing an additional security action on the additional executable file based on the additional assigned reputation of the additional executable file in the reputation system.

5. The computer-implemented method of claim 1, wherein:
   identifying the executable file comprises determining that the executable file is a singleton that has not been previously identified on any computing system connected to the reputation system; and
   performing the security action on the executable file that is based on the reputation of the code object rather than the assigned reputation of the executable file due to the executable file is in response to determining that the executable file is the singleton.

6. The computer-implemented method of claim 1, wherein:
   identifying the executable file comprises quarantining the executable file; and
   performing the security action on the executable file comprises removing the executable file from quarantine.

7. The computer-implemented method of claim 1, further comprising:
   identifying an additional executable file that was produced by an additional code object;
   monitoring behavior of the additional executable file; and
   assigning a reputation to the additional code object in the reputation system based on the behavior of the additional executable file.

8. The computer-implemented method of claim 1, wherein determining that the executable file was produced by the just-in-time compiler compiling the code object on the computing device comprises:
   configuring the just-in-time compiler to store output to a specified file system layer; and
   monitoring the specified file system layer to which the just-in-time compiler stores the output.

9. The computer-implemented method of claim 1, wherein determining that the executable file was produced by the just-in-time compiler compiling the code object on the computing device comprises hooking the just-in-time compiler.

10. The computer-implemented method of claim 1, wherein determining that the executable file was produced by the just-in-time compiler compiling the code object on the computing device comprises determining that just-in-time compiler produced the executable file within a predetermined time of the just-in-time compiler reading the code object.

11. The computer-implemented method of claim 1, wherein the intermediate language comprises bytecode.

12. A system for evaluating unfamiliar executables, the system comprising:
   an identification module, stored in memory, that identifies, on a computing device:
      a code object that is generated from source code written in a programming language, that is specified in an intermediate language different from the programming language, and that can be compiled into an executable file by a just-in-time compiler on the computing device; and
      an executable file that lacks an assigned reputation in a reputation system that distinguishes benign and malicious files;
   a determination module, stored in memory, that associates the executable file with the code object based on determining that the executable file was produced by the just-in-time compiler compiling the code object on the computing device;

a retrieving module, stored in memory, that retrieves, from the reputation system and in response to associating the executable file with the code object, a reputation for the code object;

a security module, stored in memory, that performs a security action on the executable file that is based on the reputation of the code object rather than the assigned reputation of the executable file due to the executable file lacking the assigned reputation in the reputation system; and at least one physical processor configured to execute the identification module, the determination module, the retrieving module, and the security module.

13. The system of claim 12, wherein the security module performs the security action by allowing the executable file to execute based on determining, based on the reputation of the code object, the code object is benign.

14. The system of claim 12, wherein the security module performs the security action by preventing the executable file from executing based on determining, based on the reputation of the code object, that the code object is malicious.

15. The system of claim 12, wherein:
the identification module further identifies an additional executable file that has an additional assigned reputation in the reputation system; and
the security module further performs an additional security action on the additional executable file based on the additional assigned reputation of the additional executable file in the reputation system.

16. The system of claim 12, wherein:
the identification module identifies the executable file by determining that the executable file is a singleton that has not been previously identified on any computing system connected to the reputation system; and
the security module performs the security action on the executable file that is based on the reputation of the code object rather than the assigned reputation of the executable file due to the executable file in response to determining that the executable file is the singleton.

17. The system of claim 12, wherein:
the identification module quarantines the executable file; and
the security module performs the security action on the executable file by removing the executable file from quarantine.

18. The system of claim 12, wherein the identification module further:
identifies an additional executable file that was produced by an additional code object;
monitors behavior of the additional executable file; and
assigns a reputation to the additional code object in the reputation system based on the behavior of the additional executable file.

19. The system of claim 12, wherein the determination module determines that the executable file was produced by the just-in-time compiler compiling the code object on the computing device by:
configuring the just-in-time compiler to store output to a specified file system layer; and
monitoring the specified file system layer to which the just-in-time compiler stores the output.

20. A non-transitory computer-readable medium comprising one or more computer-readable instructions that, when executed by at least one processor of a computing device, cause the computing device to:
identify, on the computing device:
a code object that is generated from source code written in a programming language, that is specified in an intermediate language different from the programming language, and that can be compiled into an executable file by a just-in-time compiler on the computing device; and
an executable file that lacks an assigned reputation in a reputation system that distinguishes benign and malicious files;
associate the executable file with the code object based on determining that the executable file was produced by the just-in-time compiler compiling the code object on the computing device; and
in response to associating the executable file with the code object:
retrieve, from the reputation system, a reputation for the code object; and
perform a security action on the executable file that is based on the reputation of the code object rather than the assigned reputation of the executable file due to the executable file lacking the assigned reputation in the reputation system.

* * * * *

UNITED STATES PATENT AND TRADEMARK OFFICE
CERTIFICATE OF CORRECTION

PATENT NO.           : 10,678,917 B1
APPLICATION NO.      : 15/826642
DATED                : June 9, 2020
INVENTOR(S)          : Brian T. Witten et al.

It is certified that error appears in the above-identified patent and that said Letters Patent is hereby corrected as shown below:

On the Title Page

Item (71), Applicant, Line 1, delete "Mountian" and insert -- Mountain --, therefor.

Signed and Sealed this
Twenty-eighth Day of July, 2020

Andrei Iancu
*Director of the United States Patent and Trademark Office*